United States Patent
Bauchot et al.

(10) Patent No.: US 8,265,396 B2
(45) Date of Patent: Sep. 11, 2012

(54) DATA ENTRY RETRIEVAL

(75) Inventors: Frederic Bauchot, Saint-Jeannet (FR); Jean-Luc Collet, La Gaude (FR); Gerard Marmigere, Drap (FR); Joaquin Picon, St. Laurent du Var (FR)

(73) Assignee: International Business Machines Corporation, Armonk, NY (US)

( * ) Notice: Subject to any disclaimer, the term of this patent is extended or adjusted under 35 U.S.C. 154(b) by 946 days.

(21) Appl. No.: 12/327,243

(22) Filed: Dec. 3, 2008

(65) Prior Publication Data

US 2009/0158090 A1 Jun. 18, 2009

(51) Int. Cl.
*G06K 9/03* (2006.01)
*G06K 9/20* (2006.01)
*G06F 3/048* (2006.01)
*G06F 9/30* (2006.01)

(52) U.S. Cl. ........ 382/187; 382/310; 382/321; 715/781; 712/201

(58) Field of Classification Search .................. 382/187, 382/228, 310, 311, 321; 713/182, 150, 156; 715/224, 781, 866; 726/26; 375/E7.093, 375/E7.144, E7.2113, E7.211, E7.094; 714/E11.072; 712/200, 201; 711/130, E12.003, 711/E12.079, E12.038; 340/5.2; 345/530; 707/999.002, 999.003
See application file for complete search history.

(56) References Cited

U.S. PATENT DOCUMENTS

| | | | |
|---|---|---|---|
| 6,151,611 A | 11/2000 | Siegel | |
| 6,172,664 B1 * | 1/2001 | Nakasuji et al. | 726/26 |
| 6,701,454 B1 | 3/2004 | Fischer et al. | |
| 6,874,120 B2 * | 3/2005 | Le et al. | 715/224 |
| 6,970,609 B2 * | 11/2005 | Sakai et al. | 382/305 |
| 7,139,916 B2 * | 11/2006 | Billingsley et al. | 713/182 |
| 2004/0003258 A1 | 1/2004 | Billingsley et al. | |

\* cited by examiner

*Primary Examiner* — Sheela Chawan
(74) *Attorney, Agent, or Firm* — Hoffman Warnick LLC; Jean M. Sullivan

(57) ABSTRACT

The present invention provides for the recovery of characters entered into at least one data entry zone of a data entry window. A method in accordance with an embodiment includes: storing a first image of the data entry window during data entry; subtracting a reference image from the first image to obtain a delta image, wherein the reference image is an image of the data entry window without data entered; identifying at least one non empty zone of the delta image and the location of the at least one data entry zone on the data entry window from the location of the at least one non empty zone on the delta image; extracting at least one character by applying optical character recognition to the least one non empty zone; and inputting the at least one character into the location of the at least one data entry zone.

19 Claims, 5 Drawing Sheets

DATA ENTRY RETRIEVAL

FIELD OF THE INVENTION

The invention relates to a method, computer program product, and data processing systems for the retrieval of data entry.

BACKGROUND

Data entry is the process of a user entering data into a computer system or data processing system. During data entry, a user may input data using a keyboard or similar input device into a data entry window displayed on a screen or other display device of a data processing system. Data entry is required in a variety of applications, for example to input data into fields on a website, to fill a database, or spreadsheet.

Data entry programs often require a user to enter data into a complete data entry window before the data entered by the user is saved. Therefore, should a system failure, network failure, or other interruption occur before the user has completed data entry, the data entered before the interrupting event is lost. In such an event, the user must re-enter the previously entered data, thus requiring an additional amount of the user's time.

SUMMARY OF THE INVENTION

According to an embodiment of the present invention, there is provided a method of recovering characters entered into at least one data entry zone of a data entry window. The method comprises storing a first image of the data entry window during data entry. A reference image is then subtracted from the first image to obtain a delta image. The reference image is an image of the data entry window without data entered. At least one non-empty zone of the delta image is identified. The location of the at least one data entry zone on the data entry window is identified from the location of the at least one non empty zone on the delta image. The method further comprises extracting at least one character by applying optical character recognition to the at least one non-empty zone of the delta image. The method further comprises inputting the at least one character into the at least one data entry zone.

Embodiments of the present invention are particularly advantageous as the characters entered into the data entry window are stored. This has the advantage over prior art methods which include for example logging key presses that the location where the data entry occurred is also stored. Embodiments of the present invention have the further advantage that data entered using cut and paste techniques from a clipboard is also stored.

According to an embodiment of the present invention the method further comprises prompting a user for entry in the event that the optical character recognition fails.

According to an embodiment of the present invention, the method further comprises storing data indicative of a pointer position in the first image. The identifying of at least one non-empty zone further comprises excluding the position of the pointer.

According to an embodiment of the present invention, the method further comprises storing a plurality of images of the data entry window during data entry, and receiving a user selection of one of the plurality of images as the first image.

According to an embodiment of the present invention, the inputting of at least one character comprises positioning the pointer at the location of the at least one data entry zone of the data entry window and emulating keyboard entry of the at least one character.

According to an embodiment of the present invention, there is provided a computer readable medium. The computer readable medium comprises computer readable program, which when executed, causes a computer to perform a method in accordance with the present invention.

According to an embodiment of the present invention, there is provided a data processing system for recovering characters entered into a data entry window. According to an embodiment of the present invention, there is provided a data processing system. The data processing system comprises a display for displaying an input window, an input device for inputting data into the input window, a screen capture module for capturing at least a first image of the input window. The data processing system further comprises storage for the at least first image. The data processing system further comprises a processor for determining a delta image from the differences between the at least first image and a reference image of the input window. The data processing system further comprises an optical character recognition module for determining at least one character from the delta image. The data processing system further comprises an input device simulation module for inputting the at least one character into the input window.

According to an embodiment of the present invention, the display is further operable to display a cursor. The screen capture module is further operable to capture the position of the cursor and the processor is further operable to determine whether a section of the delta image represents the cursor.

According to an embodiment of the present invention, the processor is further operable to determine non-empty zones of the delta image.

According to an embodiment of the present invention, the screen capture module is operable to capture a plurality of images of the input window and the data processing system further comprises an interface for receiving a user selection of the images of the plurality of images as the first image.

BRIEF DESCRIPTION OF THE DRAWINGS

In the following, embodiments of the invention will be described, in greater detail, by way of example only, making reference to the drawings.

DETAILED DESCRIPTION OF THE INVENTION

Figure 1:
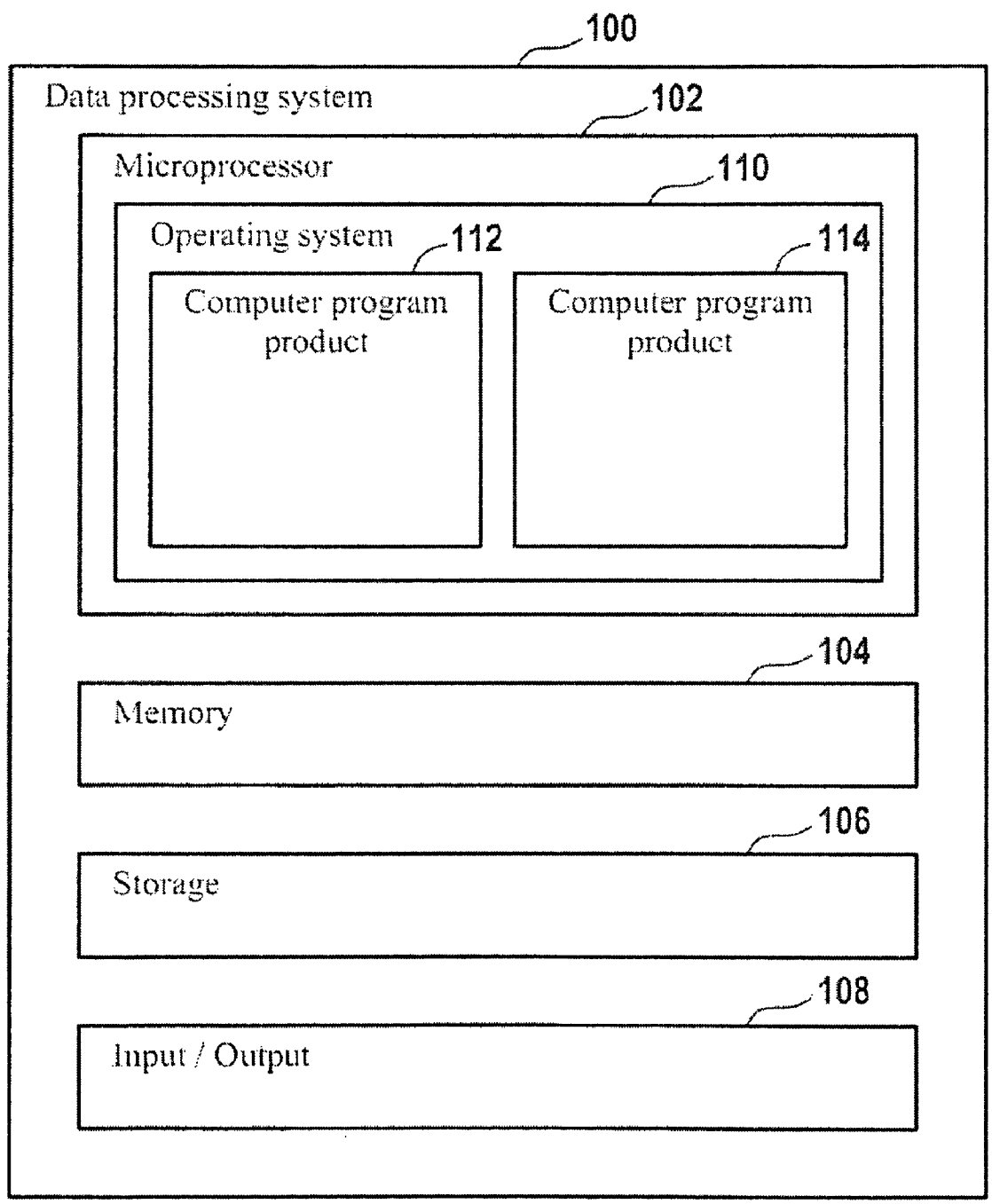
FIG. 1 shows a block diagram of a data processing system.

FIG. 1 shows a block diagram of a data processing system 100. Data processing system 100 comprises microprocessor 102 (also commonly referred to as a processor), memory 104, storage 106 and input/output 108. Microprocessor 102 executes an operating system 110. The operating system 110 is used, for example, to execute computer program products 112 and 114. The code of the operating system 110, computer program product 112, and computer program product 114 can be stored in memory 104 and loaded for execution onto microprocessor 102. Storage 106 may be volatile storage or non-volatile storage. In an embodiment, storage 106 is non-volatile storage. Input/output 108 may include an input device such as a keyboard, or mouse and a display. Computer program product 112 can be regarded as a data entry tool for displaying a data entry window to a user via input/output 108, and receiving a user input of data entry from input/output 108. Computer program product 114 can be regarded as a tool for recovering characters entered into the data entry window following failure. Computer program product 114 may be implemented as a component of operating system 110, or alternatively it may be a component of computer program product 112. Alternatively, it may be a stand-alone program. Computer program product 112 may be a web browser capable of displaying web pages. Web pages may contain data entry fields. The window displaying the data entry fields of the web browser would then make up a data entry window. The term data entry zone is used to refer to a data entry field. Alternatively, computer program product 112 may be a database input or a spreadsheet. Those of skill in the art will recognize that the nature of computer program product 112 is not limited to the examples given, and computer program product 112 may include any computer program or functionality which requires the entry of data via a data entry window by a user. Methods consistent with the steps performed by computer program product 114 are described with reference to FIGS. 2, 3 and 4 below.

Figure 2:
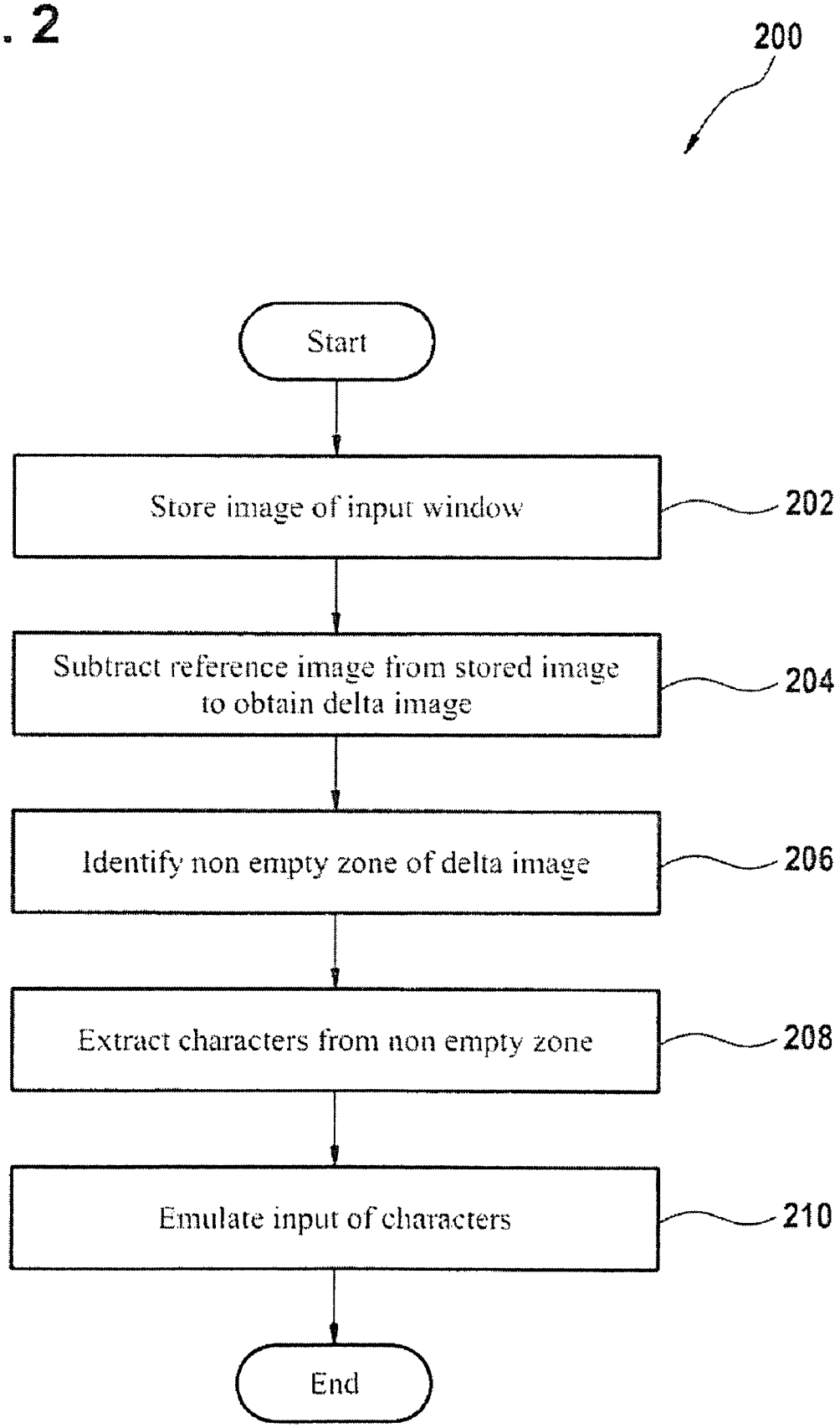
FIG. 2 shows a flow diagram illustrating steps performed in a method of recovering characters entered into a data entry window in accordance with an embodiment of the invention.

FIG. 2 shows a flow diagram illustrating a method 200 for recovering characters entered into a data entry window. In step 202, an image is stored of an input window. The term input window is used here to describe a data entry window which is the focused window displayed on a display device. The input window has at least one data entry zone. The image stored in step 202 contains an input screen and at least one character entered by a user. The image of the input window stored in step 202 may be stored in non-volatile memory. This may, for example, include storing an image on a hard disc drive. Steps 204-210 are carried out in order to recover data entered to a data entry window. In step 204, a reference image is subtracted from the stored image to obtain a delta image. The reference image is an image of the data entry window prior to data entry. The delta image therefore represents differences between the image of the data entry window stored in step 202 which contains images of characters that a user has entered, and the reference image which does not contain the user entered characters. Therefore, the delta image represents the characters entered by the user. In step 206, a non-empty zone of the delta image is identified. Since the delta image represents an image of the data entry of a user, a non-empty zone of the delta image represents the characters entered by a user into a data entry field of the data entry window. In step 208, characters are extracted from the non-empty zone of the delta image. Characters may be extracted in step 208 using, for example, an optical character recognition algorithm. In step 210, the characters from the optical character recognition algorithm are input into the data entry window.

Figure 3:
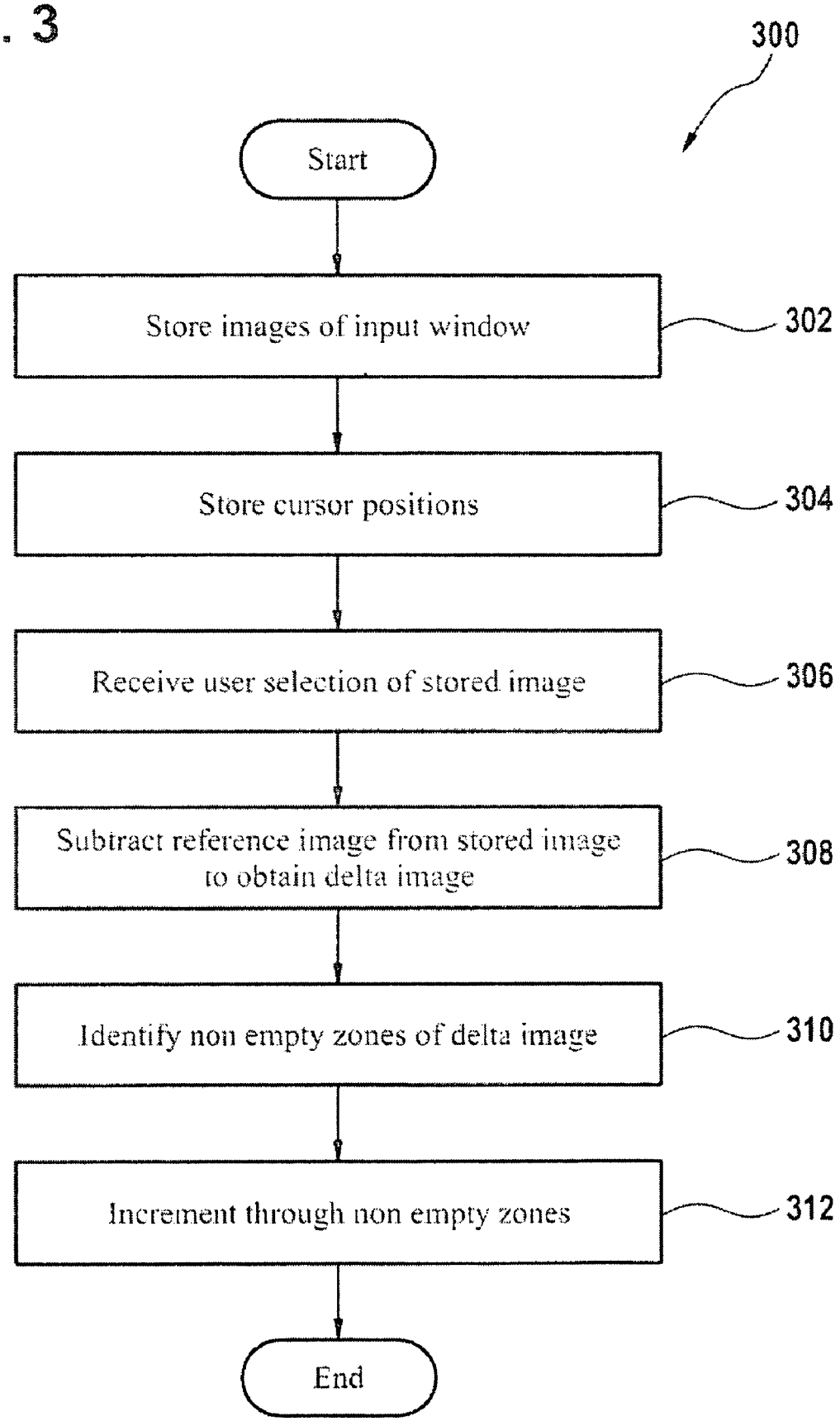
FIG. 3 shows a flow diagram illustrating steps performed in a method of recovering characters entered into a data entry window in accordance with an embodiment of the invention.
Figure 4:
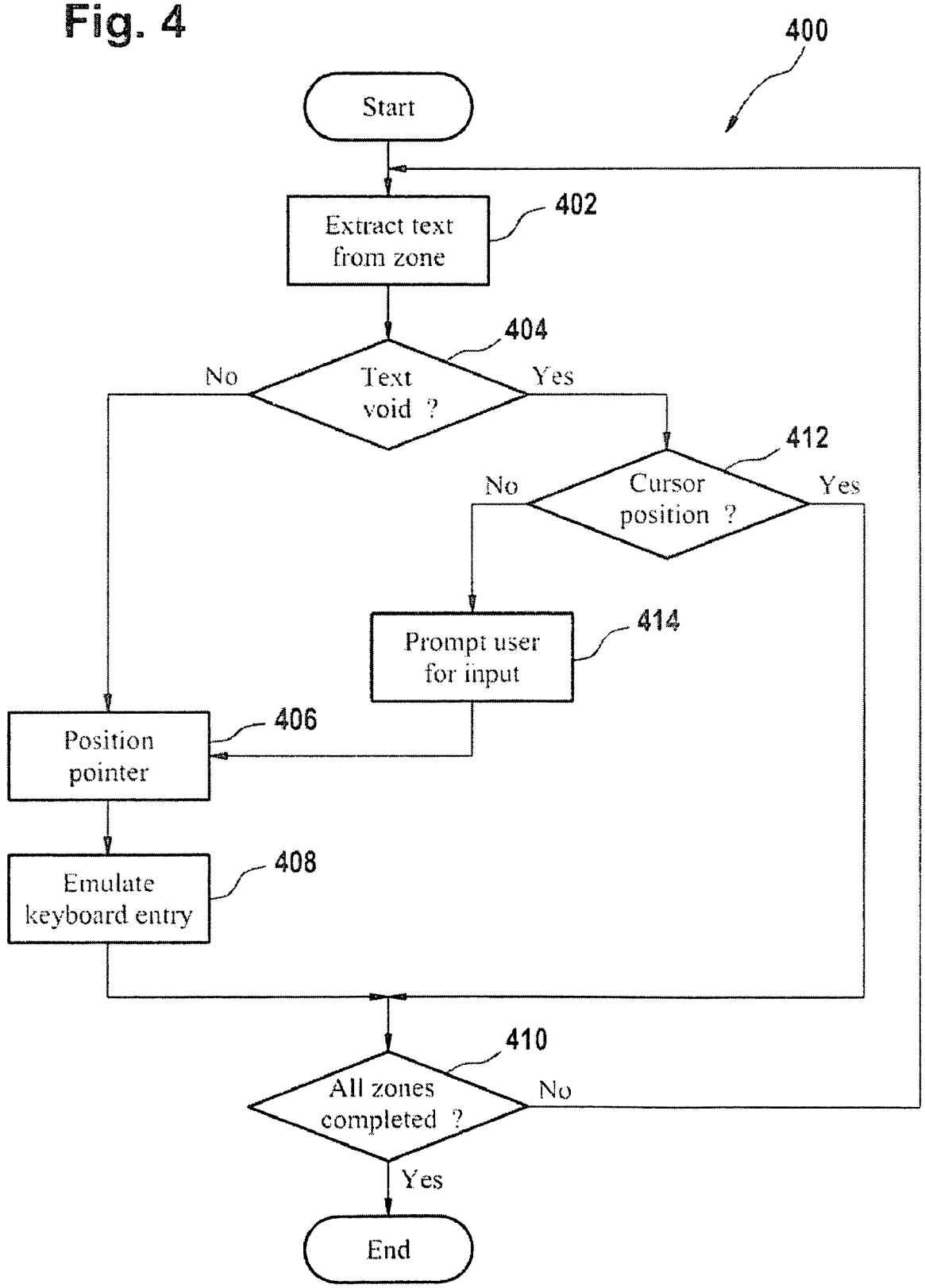
FIG. 4 shows a flow diagram illustrating steps performed in a method of incrementing through non-empty zones in accordance with an embodiment of the invention.

FIG. 3 shows a flow diagram illustrating a method 300 of recovering text or characters entered into a data entry window. In step 302, images of a data entry input window are stored during data entry. Step 302 may include storing a number of images of the data entry window. Images may be stored at a certain time interval for example, or following a certain amount of user activity or data input. In step 304, cursor positions are stored. For each of the images of the data input window stored in step 302, the location of the cursor is stored in step 304. Thus, in the storage of the data processing system, a number of images of the data entry window, and corresponding cursor positions are stored. Steps 306 to 312 correspond to the method of recovering data entries stored in steps 302 and 304. In step 306, a user selection of a stored image is received. All of the images stored in step 302 may be displayed to the user, and the user may choose one of the displayed images to recover the data entry. In step 308, a reference image is subtracted from the stored image selected by the user in step 306 to obtain a delta image. The delta image thus comprises an image of characters entered into the data entry window. In step 310, non-empty zones of delta image are identified. Step 310 may include identifying the positions of the non-empty zone on the data entry window. This may, for example, include identifying the coordinates of the corners of each of the non-empty zones of delta image. In step 312, further processing occurs incrementing through each of the non-empty zones identified in step 310. FIG. 4 shows this process in more detail.

FIG. 4 shows a flow diagram 400 illustrating method steps involved in incrementing through non-empty zones of a delta image. In step 402, text is extracted from the non-empty zone. This is achieved by applying an optical character recognition algorithm to the non-empty zone of the delta image. In step 404, a determination is made as to whether the text or characters from the optical character recognition algorithm are void. If the text from the optical character recognition algorithm is determined not to be void, the method moves to step 406. In step 406, the cursor or pointer is positioned over the location on the data entry window of the non-empty zone. This may include for example moving the cursor to the top left hand corner of the non-empty zone, and relating a left mouse click. In step 408, keyboard entry of the text extracted in step 402 is emulated. Thus, text or characters from the stored image are entered into the data entry field. In step 410 a determination is made as to whether all non-empty zones have been processed. If all non-empty zones have been processed, the method finishes if further non-empty zones exist, the method returns to step 402. If in step 404, the text or characters are found to be void, that is, the optical character recognition algorithm fails to return characters, the method moves to step 412. In step 412, the location of the non-empty zone on the data entry window is compared with the stored cursor position. If the non-empty zone is in the same position as the stored cursor position, the method moves to step 410 and either moves onto the next non-empty zone or the method finishes. If however in step 412, the cursor position does not match the position of the non-empty zone, a user is prompted for input in step 414. Then, the method moves to step 406 and continues as described above.

In order to facilitate the comparison of the stored image and the reference image, the stored image and the reference image may be of the same size.

Further, a mapping between a non empty zone of the delta image and the reference image may be displayed using an overlay mechanism. The overlay mechanism may comprise displaying the reference image and displaying a stored image over the top of the reference image using a transparency overlay. The transparency overlay may be, for example, 50%. In the case of recognition failure, this can facilitate user actions, for example the user input of characters response to the prompt in step 414. Additionally this may help to configure the optical character recognition engine.

Figure 5:
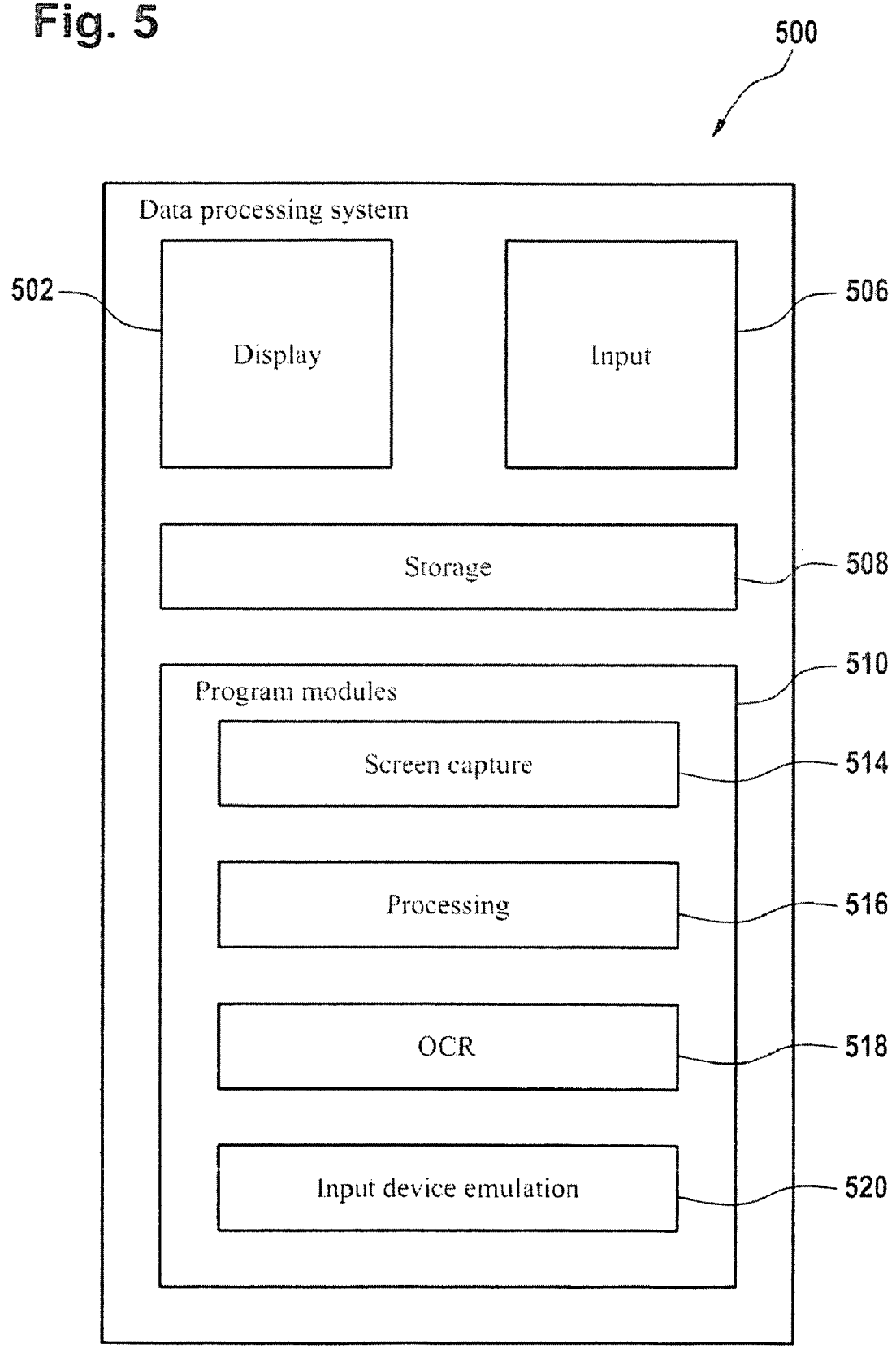
FIG. 5 shows a block diagram of a data processing system in accordance with an embodiment of the invention.

FIG. 5 shows a data processing system 500 for recovering characters entered into a data entry window. Data processing system 500 comprises display 502, input 506, storage 508 and program modules 510. Display 502 is operable to display a data entry window to a user. The user may input data into fields of the data entry window through input 506. Input 506 may for example be a keyboard. Those of skill in the art will recognize however that input 506 may not be limited to a keyboard, as, for example data may be input into fields of the data entry window by using a cut and past technique from a clipboard storing data. Storage 508 stores images of the input window. Display 502 may display a cursor in addition to the input window and storage 508 may store the positions of the cursor in addition to images of the input window. Program modules 510 include screen capture module 514, processing module 516, optical character recognition module 518 and input device emulation module 520. Screen capture module 514 is operable to capture images of the input window displayed on display 502. Screen capture module 514 may be further operable to capture the location of a cursor on display 502. Screen capture module 514 stores the image data from the screen captures and the cursor positions in storage 508. Processing module 516 is operable to determine a delta image from the differences between the images stored in storage 508 and a reference image of the input window prior to data entry. Optical character recognition module 518 is operable to determine characters from the delta image. Input device emulation module 520 is operable to input characters into the input window. Processing module 516 may be operable to determine whether a section of the delta image represents the cursor. The processing module 516 may be a processor and may be further operable to identify non-empty zones of the delta image.

The invention can take the form of an entirely hardware embodiment, an entirely software embodiment, or an embodiment containing both hardware and software elements. In an embodiment, the invention is implemented in software, which includes but is not limited to firmware, resident software, microcode, etc.

Furthermore, the invention can take the form of a computer program product accessible from a computer usable or computer readable medium providing program code for use by or in connection with a computer or any instruction execution system. For the purposes of this description, a computer usable or computer readable medium can be any apparatus that can contain, store, communicate, or transport the program for use by or in connection with the instruction execution system, apparatus, or device.

The medium can be an electronic, magnetic, optical, electromagnetic, infrared or semiconductor system (or apparatus or device). Examples of a computer readable medium include a semiconductor or solid state memory, magnetic tape, a removable computer diskette, a random access memory, a read only memory, rigid magnetic disc, and an optical disc. Current examples of optical discs include compact disc read only memory, compact disc read/write, and DVD.

A data processing system suitable for storing and/or executing program code will include at least one processor coupled directly or indirectly to memory elements through a system bus. The memory elements can include local memory employed during actual execution of the program code, bulk storage and cache memories which provide temporary storage of at least some program code in order to reduce the number of times code must be retrieved from bulk storage during execution. Input/output or I/O devices (including but not limited to keyboards, displays, pointing devices etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available network adapters.

While various illustrative embodiments of the invention have been described above, it will be appreciated by those skilled in the art that variations and modifications may be made. Thus, the scope of the invention is defined by the following claims.

The invention claimed is:

1. A method of recovering characters entered into at least one data entry zone of a data entry window, the method comprising:
   storing a first image of the data entry window during data entry;
   subtracting a reference image from the first image to obtain a delta image, wherein the reference image is an image of the data entry window without data entered;
   identifying at least one non empty zone of the delta image and a location of the at least one data entry zone on the data entry window from a location of the at least one non empty zone on the delta image;
   extracting at least one character by applying optical character recognition to the at least one non empty zone; and
   inputting the at least one character into the location of the at least one data entry zone.

2. The method of claim 1, further comprising:
   prompting a user for entry if the optical character recognition fails.

3. The method of claim 1, further comprising:
   storing data indicative of a pointer position in the first image, wherein identifying at least one empty zone further comprises excluding the position of the pointer.

4. The method of claim 1, further comprising;
   storing a plurality of images of the data entry window during data entry, and
   receiving a user selection of one of the plurality of images as the first image.

5. The method of claim 1, wherein inputting the at least one character further comprises:
   positioning a pointer at the location of the at least one data entry zone; and
   emulating keyboard entry of the at least one character.

6. A computer program product stored on a non-transitory computer usable medium, which when executed, recovers characters entered into at least one data entry zone of a data entry window, the program product comprising program code for:
   storing a first image of the data entry window during data entry;
   subtracting a reference image from the first image to obtain a delta image, wherein the reference image is an image of the data entry window without data entered;
   identifying at least one non empty zone of the delta image and a location of the at least one data entry zone on the data entry window from a location of the at least one non empty zone on the delta image;
   extracting at least one character by applying optical character recognition to the at least one non empty zone; and
   inputting the at least one character into the location of the at least one data entry zone.

7. The computer program product of claim 6, further comprising program code for:
   prompting a user for entry if the optical character recognition fails.

8. The computer program product of claim 6, further comprising program code for:

storing data indicative of a pointer position in the first image, wherein identifying at least one empty zone further comprises excluding the position of the pointer.

9. The computer program product of claim 6, further comprising program code for:
   storing a plurality of images of the data entry window during data entry; and
   receiving a user selection of one of the plurality of images as the first image.

10. The computer program product of claim 6, wherein the inputting the at least one character further comprises:
    positioning a pointer at the location of the at least one data entry zone; and
    emulating keyboard entry of the at least one character.

11. A data processing system for recovering characters entered into at least one data entry zone of a data entry window, the data processing system comprising:
    a system for storing a first image of the data entry window during data entry;
    a system for subtracting a reference image from the first image to obtain a delta image, wherein the reference image is an image of the data entry window without data entered;
    a system for identifying at least one non empty zone of the delta image and a location of the at least one data entry zone on the data entry window from a location of the at least one non empty zone on the delta image;
    a system for extracting at least one character by applying optical character recognition to the least one non empty zone; and
    a system for inputting the at least one character into the location of the at least one data entry zone.

12. The data processing system of claim 11, further comprising:
    a system for prompting a user for entry in the event that the optical character recognition fails.

13. The data processing system of claim 11, further comprising:
    a system for storing data indicative of a pointer position in the first image, wherein the system for identifying at least one empty zone excludes the position of the pointer.

14. The data processing system of claim 11, further comprising:
    a system for storing a plurality of images of the data entry window during data entry; and
    a system for receiving a user selection of one of the plurality of images as the first image.

15. The data processing system of claim 11, wherein the system for inputting the at least one character positions a pointer at the location of the at least one data entry zone and emulates keyboard entry of the at least one character.

16. A data processing system comprising:
    a display for displaying an input window;
    an input device for inputting data into the input window;
    a screen capture module for capturing at least a first image of the input window;
    storage for the at least first image;
    a processor for determining a delta image from differences between the at least first image and a reference image of the input window;
    an optical character recognition module for determining at least one character from the delta image; and
    an input device emulation module for inputting the at least one character into the input window.

17. The data processing system of claim 16, wherein the display displays a cursor, the screen capture module captures a position of the cursor, and the processor determines whether a section of the delta image represents the cursor.

18. The data processing system of claim 16, wherein the processor determines non empty zones of the delta image.

19. The data processing system of claim 16, wherein the screen capture module captures a plurality of images of the input window, and wherein the data processing system further comprises an interface for receiving a user selection of one of the images of the plurality of images as the at least first image.

* * * * *